United States Patent
Greco et al.

(10) Patent No.: US 8,918,651 B2
(45) Date of Patent: Dec. 23, 2014

(54) CRYPTOGRAPHIC ERASURE OF SELECTED ENCRYPTED DATA

(75) Inventors: Paul Merrill Greco, Tucson, AZ (US); Glen Alan Jaquette, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 47 days.

(21) Appl. No.: 13/471,005

(22) Filed: May 14, 2012

(65) Prior Publication Data

US 2013/0305057 A1  Nov. 14, 2013

(51) Int. Cl.
*H04L 9/14* (2006.01)
*H04L 9/00* (2006.01)
*G06F 12/14* (2006.01)
*H04L 9/08* (2006.01)
*G06F 21/62* (2013.01)
*G06F 3/06* (2006.01)

(52) U.S. Cl.
CPC .............. *G06F 21/62* (2013.01); *G06F 3/0652* (2013.01)
USPC ............................ 713/189; 713/193; 380/277

(58) Field of Classification Search
CPC ................ G06F 2221/2107; G06F 2221/2143; G06F 21/62; G11B 2220/90; H04L 9/083; H04L 9/0891; H04L 9/0894
See application file for complete search history.

(56) References Cited

U.S. PATENT DOCUMENTS

| | | | | |
|---|---|---|---|---|
| 4,941,176 A * | 7/1990 | Matyas et al. | ................ | 380/280 |
| 5,864,706 A * | 1/1999 | Kurokawa et al. | ............. | 712/35 |
| 6,158,004 A * | 12/2000 | Mason et al. | ................. | 713/150 |
| 6,584,552 B1 * | 6/2003 | Kuno et al. | .................... | 711/163 |
| 7,512,812 B2 | 3/2009 | Sohn | | |
| 7,672,460 B2 * | 3/2010 | Furukawa et al. | ............ | 380/281 |
| 7,818,587 B2 * | 10/2010 | Drew et al. | .................... | 713/193 |
| 7,912,223 B2 | 3/2011 | Osaki | | |
| 2003/0037248 A1 * | 2/2003 | Launchbury et al. | ......... | 713/193 |
| 2004/0213546 A1 * | 10/2004 | Poslinski et al. | ................ | 386/49 |
| 2005/0071661 A1 * | 3/2005 | Yamada | ........................ | 713/193 |
| 2005/0086505 A1 * | 4/2005 | Ishibashi et al. | ............. | 713/193 |
| 2005/0177716 A1 * | 8/2005 | Ginter et al. | .................. | 713/157 |
| 2006/0095380 A1 * | 5/2006 | Hsu et al. | ........................ | 705/57 |
| 2006/0153378 A1 * | 7/2006 | Lotspiech et al. | ............ | 380/201 |
| 2007/0198827 A1 * | 8/2007 | Ono | ................ | 713/153 |
| 2008/0065881 A1 * | 3/2008 | Dawson et al. | ............... | 713/165 |

(Continued)

FOREIGN PATENT DOCUMENTS

EP              575765 A1 * 12/1993 .............. G06F 12/02

OTHER PUBLICATIONS

Boneh, "A Revocable Backup System", Proceedings of the Sixth USENIX UNIX Security Symposium, Jul. 1996, 7 pages.*

(Continued)

*Primary Examiner* — Andrew Nalven
*Assistant Examiner* — Walter Malinowski
(74) *Attorney, Agent, or Firm* — Griffiths & Seaton PLLC (57) ABSTRACT

Exemplary method, system, and computer program product embodiments for cryptographic erasure of selected encrypted data are provided. In one embodiment, by way of example only, data files are configured with a derived key. The derived keys adapted to be individually shredded in a subsequent erasure operation. The derived key allows for cryptographic erasure of the selected encrypted data in the data files without necessitating at least one of removal and rewrite of retained data. Additional system and computer program product embodiments are disclosed and provide related advantages.

12 Claims, 5 Drawing Sheets

(56) References Cited

U.S. PATENT DOCUMENTS

| | | | |
|---|---|---|---|
| 2008/0065882 A1* | 3/2008 | Goodman et al. | 713/165 |
| 2008/0165973 A1* | 7/2008 | Gavillan et al. | 380/278 |
| 2008/0232593 A1* | 9/2008 | Hsu et al. | 380/277 |
| 2008/0273696 A1* | 11/2008 | Greco et al. | 380/44 |
| 2008/0294906 A1* | 11/2008 | Chang et al. | 713/182 |
| 2009/0028322 A1* | 1/2009 | Goodman et al. | 380/2 |
| 2009/0028336 A1* | 1/2009 | Goodman et al. | 380/277 |
| 2009/0028339 A1* | 1/2009 | Goodman et al. | 380/278 |
| 2009/0049311 A1* | 2/2009 | Carlson et al. | 713/193 |
| 2009/0052664 A1* | 2/2009 | Goodman et al. | 380/44 |
| 2009/0052665 A1* | 2/2009 | Goodman et al. | 380/44 |
| 2009/0060189 A1* | 3/2009 | Osajima et al. | 380/259 |
| 2009/0247122 A1* | 10/2009 | Fitzgerald et al. | 455/410 |
| 2009/0282265 A1* | 11/2009 | Aissi et al. | 713/193 |
| 2009/0319785 A1* | 12/2009 | Wang et al. | 713/165 |
| 2010/0037055 A1* | 2/2010 | Fazio et al. | 713/171 |
| 2010/0262617 A1* | 10/2010 | Shinjo et al. | 707/769 |
| 2010/0299315 A1* | 11/2010 | Gosnell | 707/690 |
| 2010/0306544 A1* | 12/2010 | Lionetti et al. | 713/171 |
| 2011/0055559 A1* | 3/2011 | Li et al. | 713/165 |
| 2011/0252232 A1* | 10/2011 | De Atley et al. | 713/165 |
| 2012/0093318 A1* | 4/2012 | Obukhov et al. | 380/277 |

OTHER PUBLICATIONS

Gordon Hughes et al., "Tutorial on Disk Drive Data Sanitization", Sep. 2006, 15 pages.

"Self-Encrypting Drives for IBM System x", IBM Redbooks, 2010, 12 pages.

* cited by examiner

FIG. 3

CRYPTOGRAPHIC ERASURE OF SELECTED ENCRYPTED DATA

BACKGROUND OF THE INVENTION

1. Field of the Invention

The present invention relates generally to computers, and more particularly, to cryptographic erasure of selected encrypted data in a computing environment.

2. Description of the Related Art

In today's society, computer systems are commonplace. Computer systems may be found in the workplace, at home, or at school. Computer systems may include data storage systems, or disk storage systems, to process and store data. In recent years, both software and hardware technologies have experienced amazing advancement. With the new technology, more and more functions are added and greater convenience is provided for use with these computer systems. Historically, data has been stored on local storage devices, such as tape drives, hard disk drives (HDDs), and removable media such as compact discs (CDs) and digital versatile discs (DVDs). With increasing demand for faster, more powerful and more efficient ways to store and retrieve information, encryption and complete erasure of selected data within the various storage system of the computing environment is becoming a key challenge for many computer systems.

SUMMARY OF THE DESCRIBED EMBODIMENTS

As the use of data processing systems has become more prevalent, the techniques used to store and manage data, produced by such data processing systems, have evolved. One mechanism for storing and providing access to such data is the tape storage system. A conventional tape storage system comprises a tape storage drive, such as the 3592 Enterprise Tape System provided by International Business Machines Corporation of Armonk, N.Y., and a removable tape data storage medium upon which data may be stored. It is frequently desirable to control access (e.g., to prevent data from being accessed or to otherwise obscure the data's content or meaning) to data stored within a data system, such as a removable tape data storage media in order to prevent unauthorized access.

Accordingly, and in view of the foregoing, various exemplary method, system, and computer program product embodiments for cryptographic erasure of selected encrypted data are provided. In one embodiment, by way of example only, data files are configured with a derived key. The derived keys adapted to be individually shredded in a subsequent erasure operation. The derived key allows for cryptographic erasure of the selected encrypted data in the data files without necessitating at least one of removal and rewrite of retained data. Additional system and computer program product embodiments are disclosed and provide related advantages.

The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF CERTAIN EMBODIMENTS

As mentioned previously, as the use of data processing systems has become more prevalent, the techniques used to store and manage data produced by such data processing systems have evolved. One mechanism for storing and providing access to such data is the tape storage system. A conventional tape storage system comprises a tape storage drive such as the 3592 Enterprise Tape System provided by International Business Machines Corporation of Armonk, N.Y. and a removable tape data storage medium upon which data may be stored. It is frequently desirable to control access (e.g., to prevent data from being accessed or to otherwise obscure the data's content or meaning) to data stored within a data system, such as a removable tape data storage media in order to prevent unauthorized access. For example, archives of data are stored for compliance reasons that may have legal requirement to retain a piece of data for some period of time. As an example, in some cases, to be compliant with Health Insurance Portability and Accountability Act (HIPAA) regulations, radiological images of a patient may have to be kept for the life of the patient plus two years. For illustration purposes, consider the following scenario demonstrating compliance with such regulations. First, all the radiological images created at some hospital may be copied to a tape storage system for disaster recovery reasons. It may be assumed that all the radiological images are written out at the earliest opportunity, until a given tape cartridge is full. Subsequent radiological images may be loaded on another tape cartridge until the tape cartridge reaches a maximum capacity. All the radiological images on a given tape were taken in a given time period and so are temporally related. Such practices demonstrate satisfactory lower costs for the $2^{nd}$ (or $3^{rd}$) copy of the data for disaster recovery purposes. However, a patient that has an extended hospital stay, which has required many radiological images collected over many days, may have different images stored on at least 20 different tapes. If the patient dies, two years after death, the HIPAA requirement for retention of those images expires, so the files may be deleted. In fact, it may be desired that the images be deleted as soon as possible. It may also be desired that the images not only be deleted, but also cryptographically (secure) erased, so thoroughly and definitively, that as a practical matter the images may never be recovered or retried, not even with forensic means.

Thus, the mechanisms of the present invention extend the functionality of a tape drive (such as an Linear Tape-Open "LTO" LTO-5 drive) and an application or piece of middleware (such as linear tape file system "LTFS") to enable data to be cryptographically erased selectively from a tape cartridge without having to rewrite or move data which is to be retained, even if that data is written immediately before or after the data being erased. While the illustrated embodiments describe the implementation of the present invention in LTO-5, the same concepts may be applied to LTO-6, Jaguar (JAG) Jag-3, Jag-4, or an Oracle tape drive (such as T10000). The concepts may also be used with other serially written storage media such as a writeable CD or DVD. Furthermore, while the present invention is being described specifically with respect to how the present invention might be implemented with a linear tape filing system (LTFS), the illustrated embodiments may be applied to Tivoli Storage Manager (TSM), Intel Architecture (IA), Scale Out Network Attached Storage (SoNAS), Quantum's StorNext, and/or any other tape using application. Moreover, a secure erase for disk may be applied to stored data in a given sector for a given data entity (e.g. file) that may be definitively overwritten multiple times, with multiple different data patterns, to eliminate any chance for data recovery, even by forensic means.

Figure 1A:
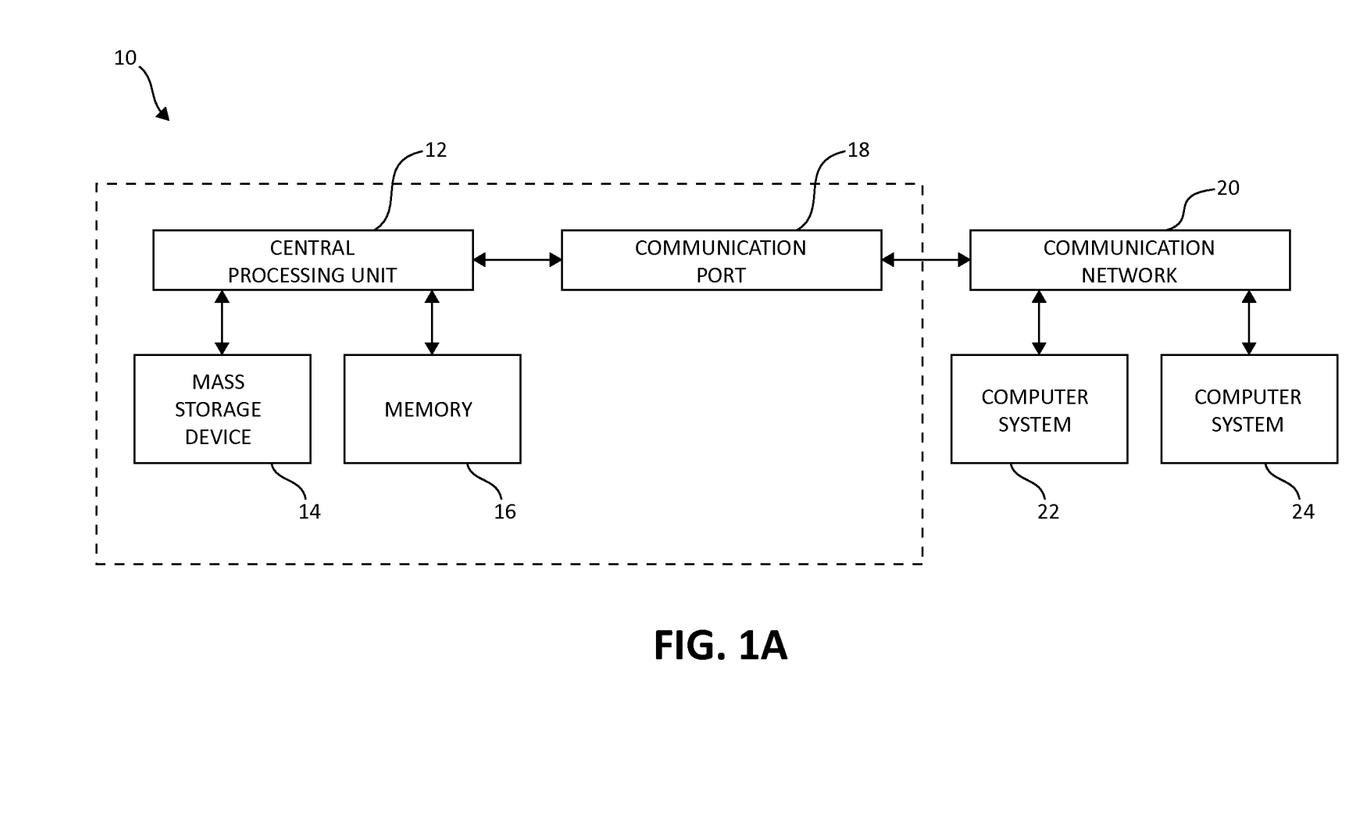
FIG. 1A illustrates a computer storage environment having a storage device in which aspects of the present invention may be realized.

Turning to FIG. 1A, an example of a computer system 10 is depicted in which aspects of the present invention may be realized. Computer system 10 includes central processing unit (CPU) 12, which is connected to mass storage device(s) 14 and memory device 16. Mass storage devices may include hard disk drive (HDD) devices, which may be configured in a redundant array of independent disks (RAID). Memory device 16 may include such memory as electrically erasable programmable read only memory (EEPROM) or a host of related devices. Memory device 16 and mass storage device 14 are connected to CPU 12 via a signal-bearing medium. In addition, CPU 12 is connected through communication port 18 to a communication network 20, having an attached plurality of additional computer systems 22 and 24. The computer system 10 may include one or more processor devices (e.g., CPU 12) and additional memory devices 16 for each individual component of the computer system 10.

Figure 1B:
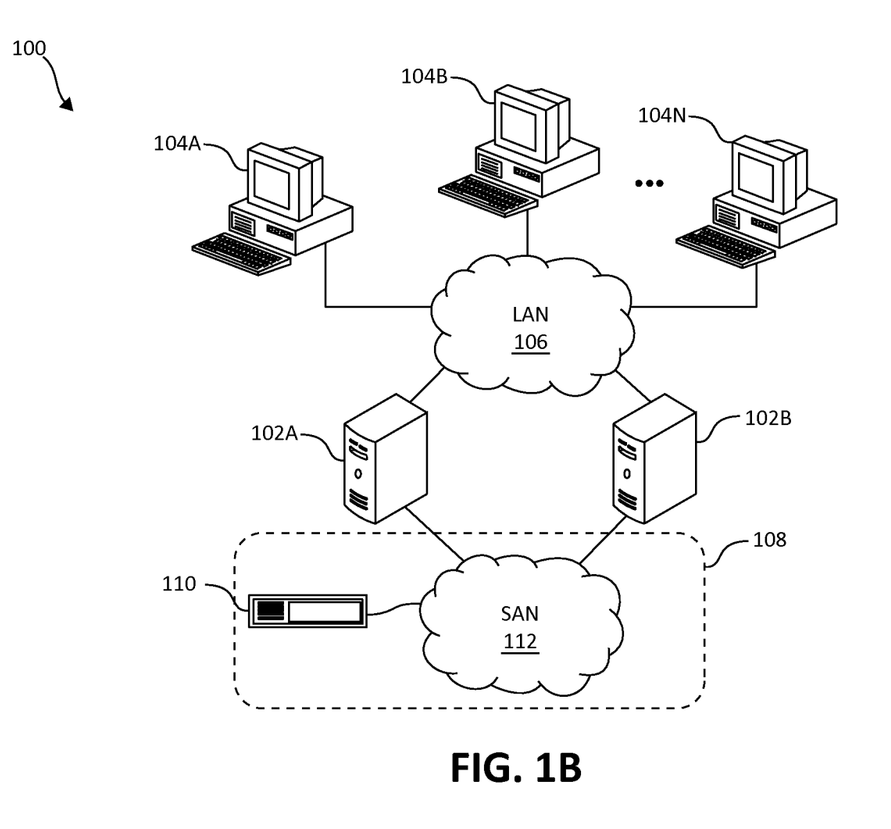
FIG. 1B illustrates a high-level block-diagram representation of an enterprise including a tape storage drive apparatus in which aspects of the present invention may be realized.

FIG. 1B is a high-level block-diagram showing a representation of an enterprise including a tape storage drive apparatus in which aspects of the present invention may be realized. Enterprise 100 of FIG. 1 comprises a number of host data processing systems (e.g., server data processing systems 102 and associated client data processing systems 104), which are communicatively coupled together via a first network interconnect (e.g., local area network or "LAN" interconnect 106) as shown. Server data processing systems 102 of the depicted embodiment are further coupled to a storage subsystem 108 including a number of data storage devices and a second network interconnect (e.g., storage area network or "SAN" interconnect 112).

In the exemplary embodiment of FIG. 1, storage subsystem 108 is depicted as including a single tape data storage device 110. In alternative embodiments of the present invention however, storage subsystem 108 may include any number and type of data storage device (e.g., individual disk drives, tape drives, disk arrays, tape arrays, RAID array subsystems, robotic tape libraries, filers, file servers) communicatively coupled together and to server data processing systems 102 via a storage interconnect (SAN interconnect 112), such as a fiber channel (FC) switch, switch fabric, arbitrated loop, or the like. Server data processing system 102A of the embodiment of FIG. 1 comprises an application server (e.g., a database server) to provide core operational functionality to one or more of client data processing systems 104A-104N (where "N" is a positive integer) and server data processing system 102B comprises another server (e.g., a cluster failover server, load-balancing server, backup server, or the like).

Tape data storage device 110 of the depicted embodiment is coupled to SAN interconnect 112 via a communication link as shown. Each communication link may comprise any of a number of communication media capable of transmitting one or more electrical, optical, and/or acoustical propagated signals (e.g., copper wiring, fiber optic cable, or the like) between SAN interconnect 112 and a communication port of tape data storage device 110.

In the illustrated embodiment, tape data storage device 110 and server data processing system 102A are configured with sufficient functionality to control and/or manage the access provided to data of a tape data storage medium within a tape cartridge coupled with tape data storage device 110 as will be further described herein. Utilizing one or more embodiments of the present invention, access to data of a tape data storage medium so-associated with tape data storage device may be restricted and/or host data processing systems accessing such data may be identified.

While a conventional SAN-type interconnect (SAN interconnect 112) has been specifically depicted in the embodiment of FIG. 1, other interconnects (e.g., direct connection, local, metropolitan, and/or wide-area networks) and other protocols (e.g., FICON, ESCON, SSA, or the like) may be utilized. Moreover, while a particular number and arrangement of elements have been illustrated with respect to enterprise 100 of FIG. 1, it should be appreciated that embodiments of the present invention are not limited to enterprises, systems, or data storage devices having any particular number, type, or arrangement of components other than as explicitly recited herein and so may encompass a wide variety of system types, architectures, and form factors.

Figure 2:
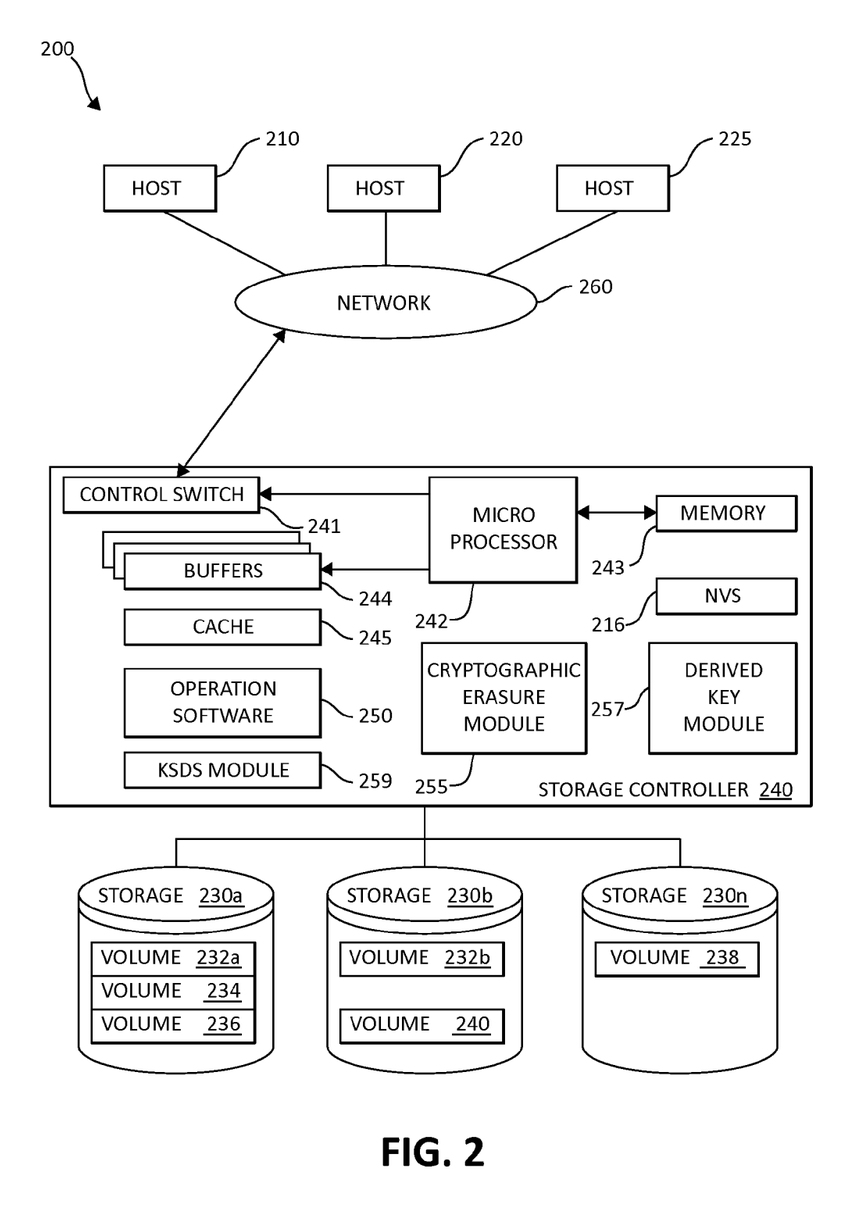
FIG. 2 illustrates an exemplary block diagram showing a hardware structure of a data storage system in a computer system in which aspects of the present invention may be realized.

In an alternative embodiment, FIG. 2 is an exemplary block diagram 200 showing a hardware structure of a data storage system in a computer system in which aspects of the present invention may be realized. Host computers 210, 220, 225, are shown, each acting as a central processing unit for performing data processing as part of a data storage system 200. The hosts (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 2 comprising storage controller 240 and storage 230.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230 may be comprised of one or more storage devices, such as storage arrays, which are connected to storage controller 240 by a storage network.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and nonvolatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request. Moreover, the tape data storage device 110 (see FIG. 1B), as described in FIG. 1B and FIG. 3, may be implemented with the architecture described in FIG. 2.

In one embodiment, by way of example only, the storage system as shown in FIG. 2 may include a logical volume, or simply "volume," and may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a cryptographic erasure module. The cryptographic erasure module 255, derived key module 257, and KSDS module 259 may work in conjunction with each and every component of the storage controller 240, the hosts 210, 220, 225, and storage devices 230. Both the cryptographic erasure module 255, derived key module 257, and KSDS module 259 may be structurally one complete module or may be associated and/or included with other individual modules. The cryptographic erasure module 255, derived key module 257, and KSDS module 259 may also be located in the cache 245 or other components.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control and each table described later, cache 245 for temporarily storing (buffering) data, and buffers 244 for assisting the cache 245 to read and write data, a control switch 241 for controlling a protocol to control data transfer to or from the storage devices 230, and cryptographic erasure module 255, derived key module 257, and KSDS module 259 in which information may be set. Multiple buffers 244 may be implemented with the present invention to assist with the operations as described herein.

In one embodiment, the host computers or one or more physical or virtual devices, 210, 220, 225 and the storage controller 240 are connected through a network adaptor (this could be a fibre channel) 260 as an interface i.e., via at least one switch called "fabric." In one embodiment, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, cryptographic erasure module 255, derived key module 257, and KSDS module 259 are in communication with each other and may be separate or one individual component(s). Also, several, if not all of the components, such as the operation software 250 may be included with the memory 243. Each of the components within the devices shown may be linked together and may be in communication with each other for purposes suited to the present invention.

Figure 3:
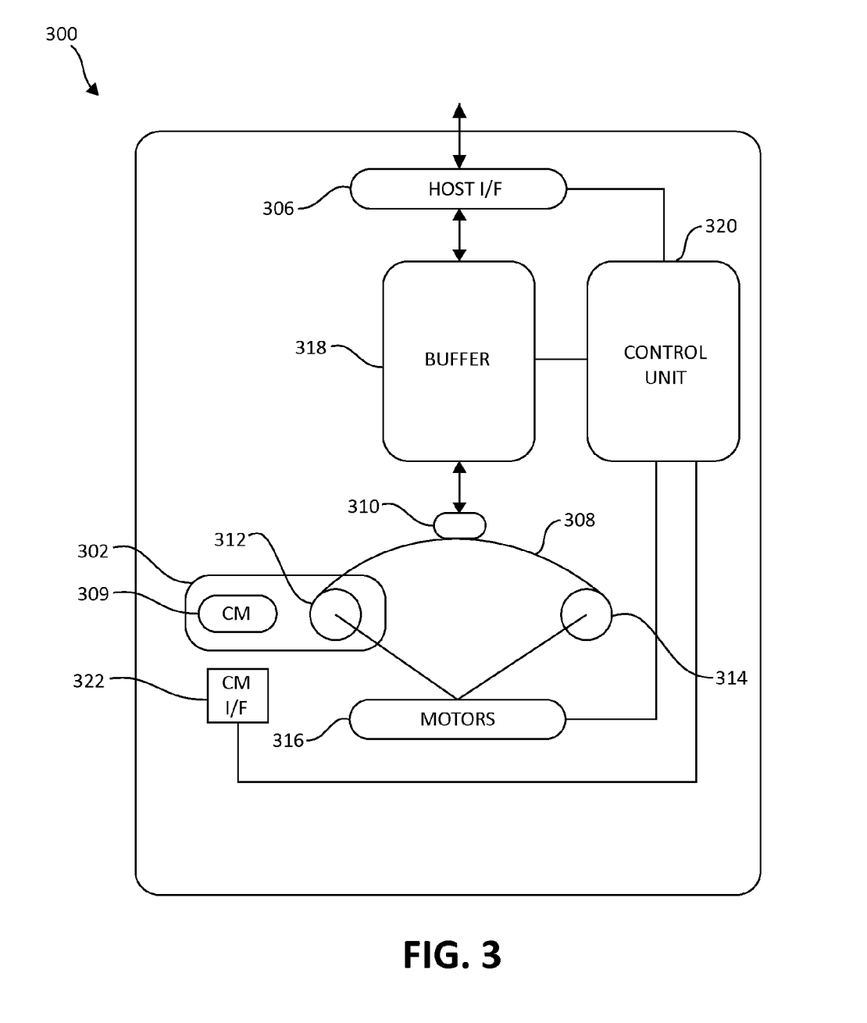
FIG. 3 illustrates an exemplary block diagram of a tape storage drive apparatus in which aspects of the present invention may be realized.

FIG. 3 is a block diagram 300 showing a tape storage drive apparatus in which aspects of the present invention may be realized. The tape data storage device 300 comprises a removable data storage tape cartridge 302 and a communication interface (e.g., host data processing system interface (I/F) 306) to communicatively couple tape data storage device 300 to one or more host data processing systems or associated communication channels (e.g., SAN interconnect 112).

The host data processing system I/F 306 is configured to receive input/output (I/O) operation requests (e.g., "read" and/or "write" requests), and process such requests in an appropriate manner to control or "manage" access to a tape data storage medium 308 (e.g., magnetic tape) of removable data storage tape cartridge 302 as described herein. In addition to tape data storage medium 308, data storage tape cartridge 302 comprises a cartridge memory (CM) module 309. CM module 309 comprises a passive, contactless silicon storage device utilized to store data about the tape cartridge (removable data storage tape cartridge 302) in which it resides. Exemplary data may include, for example, data indicating the associated tape cartridge's volume serial number (VOLSER), the "type" of data storage medium within the cartridge, and the data, if any, which is stored thereon.

Tape data storage medium 308 of removable data storage tape cartridge 302 is routed in proximity to a tape access (e.g., read/write) head 310 utilizing media transport reels 312 and 314 and one or more media transport motors 316 as shown. The tape access head 310 is configured to read data from and write data to tape data storage medium 308 and to temporarily store or "stage" such data within a buffer 318 (e.g., one or more "read-ahead" or staging buffers). The tape data storage device 300 further comprises a controller or control unit 320. Control unit 320 controls and manages data flow, formatting, and data storage subsystem operation via control signals issued to one or more of host data processing system I/F 306, buffer 318, media transport motors 316, and/or CM I/F 322 utilized to access CM 309 in order to cause one or more method or process embodiments of the present invention or operations thereof to be performed. In another embodiment, such control functionality may be incorporated into one or more of host data processing system I/F 30, and control unit 320.

In the current state of the art, there are no methods for a secure erase for tape, particularly for modern (e.g. LTO based) tape drives that would need to definitively erase a set of data (e.g., a file), and still allow reuse of the tape cartridge. First, a standard erase or overwrite of data on tape will logically erase all data downstream of that erase or overwrite because a tape is a sequential storage media, which cannot be written out of order (i.e., the tape is not random access from a write point of view). Second, tracks written to LTO tapes (starting with LTO-2) typically overwrite part of previously written tracks, a technique known as shingling. (Shingled writing allows for writing/erasing with a write head wider than the data track to be left (i.e. the residual track width), which enables backward writing.) Shingled writing requires tracks to be written in a certain order (just as the shingles on a house must be installed in a certain order—those furthest from the peak first, etc.). Shingling essentially relies on the fact that data is written sequentially, and conversely non-sequential writing is hard to imagine in the face of a shingled writing scheme. Third, a standard erase or overwrite of data on tape may consistently leave a slice of the original data unerased and/or not overwritten. This is because environmental changes (such as a change in the temperature or humidity) can cause systematic mechanical change (e.g. width of the tape relative to the width of the write head). Fourth, a standard erase or overwrite may be interrupted by a servo error, which causes the current to the write head be degated. In the user area, this functionality may be required to prevent overwrite of previously written data tracks. Yet, in trying to guarantee that a previously written data set is overwritten, this is distinctly problematic—because a stretch of nearly 4 meters of tape can go unerased (or un-overwritten). This can potentially leave a significant amount of old data on tape in fully readable form.

To address these inefficiencies, encryption may be applied. Encryption may provide for cryptographic erasure of data because a key may be used to encrypt data that is irretrievably lost, so that there may be no feasible way to read the encrypted data. Application Managed Encryption (AME) is an encryption method that may be used, but the AME requires an application to manage all the encryption keys and requires that the application have a persistent database to retain those encryption keys and some applications (such as LFTS) do not. Even if an application (such as TSM) provided a persistent database, the number of keys that would have to be retained (e.g. up to 10 million per cartridge, at up to 40 bytes each, requiring up to 400 MB per cartridge) would be excessively onerous. Moreover, many applications designed to enforce compliance regulations essentially need to manage the data as files, i.e. either interfacing with a NAS box or writing to a file system via a POSIX interface. These types of applications are typically not capable of handling tape at all.

For an LTFS, middleware may potentially allow File Using Applications to write file data to tape. However, from a compliance point of view, problems arise when a File Using Application requests a file to be deleted. One option is for the LTFS by itself to simply remove the file from the Index File and so the data would be fully recoverable. Yet there is no secure erase option to definitively erase a file. So the second option is to retain all the currently valid files and move all the valid files to another cartridge and then destroy the original cartridge. However, this is not an acceptable method due to high costs in both time (to reclaim the cartridge) and dollars (to have to destroy and then replace the original cartridge because the tape is not reusable). With a strong enough magnet, it may conceivably bulk erase a tape (e.g., with the coercivity of recent LTO tapes this requires a very strong magnet), but in the case of LTO, or tape technology based on LTO (such as the IBM® Jag drives or Oracle T10000), this will also cause the tracking servo pattern to be erased, thus rendering the tape cartridge useless (i.e. it is not reusable). So this too is costly by rendering the tape non-reusable. Thus, a need exists for the ability to selectively delete data archived to tape without having to delete or rewrite all the data written to tape.

There are many use cases where this capability is desirable—one of these is the case where there is a need for assured deletion of some subset of the data on tape, even though other data on the same tape must be retained. Because of the limitations with erasure/overwrite capability of today's tape technology, it is not acceptable since many customers require secure erase capability that definitively and forever erases the data such that it can never be recovered, even if forensic means are used. As an example, because modern tape does not support a true Secure Erase, some military users of modern tape never trust the data on a tape to be erased or unrecoverable, and so will not allow it to be transported outside of some secure facility once it has been written with data of some classification (e.g. perhaps Top Secret).

It should be note that when archive data is stored as files to a disk, the files may not simply be deleted because only the pointer to the data is deleted, and it does not cause the data itself to be erased or overwritten. Moreover, even if a given sector is overwritten once, this does not necessarily mean the data is irrevocably lost because sometimes, due to mechanical tolerances and environmental changes, there is not an exact overwrite. In other words, there may be some remnant slice of the data sector that is still recoverable by forensic means.

Modern tape drives such as LTO-4, LTO-5, Jag-2, and Jag-3 may support both application transparent (e.g., transparent encryption or Library Managed Encryption (LME)) and Application Managed Encryption (AME). In one embodiment, tape drive encryption functionality is provided. The LTO-4 may use encryption keys served to it directly and does not store encryption keys. LTO-4 technology may support the use of multiple encryption keys on a single tape cartridge, but restrict key changes in that they are only allowed on dataset boundaries, which limit the number of keys that may be used to less than one million. In LTO-4, an encryption key may either be provided by a key manager (in LME) or by an application (in AME). The encryption key may be served to the drive. The encryption key served to the drive may then be used directly—i.e. to encrypt data written to tape, or to decrypt data read from tape.

The LTO-5 may encryption keys indirectly and, since it may store the encryption keys it receives, it may store something for each key served to it. Multiple encryption keys may be used on a single tape cartridge, but key changes may only occur on dataset boundaries. An encryption key may either be provided by a key manager (in LME) or by an application (in AME). An encryption key is served to the drive, but the tape drive does not use this encryption key directly. Rather it may generate its own key, which is used to actually encrypt (or later decrypt) the data. The generated key is then wrapped with the served key, and that wrapped key is then stored to the Dataset Information Table (DSIT) of each dataset encrypted.

The Jag-2 and Jag-3 may support AME in essentially the same way that LTO-4 does, but supports transparent tape encryption (e.g. LME) quite differently. In the case of LME, LME may receive and store one or two wrapped key structures from a key manager for each encryption key used. Each wrapped key structure may be referred to as an Externally Encrypted Data Key (EEDK) and is essentially an opaque blob to the tape drive, since it cannot decrypt them itself, which stores it. When Jag drives are used to do LME, a single encryption key (the key which is wrapped to create the EEDKs) may be used to encrypt all the data on a tape cartridge. (That encryption key is only stored as EEDKs to the tape cartridge, so the tape cartridges are essentially used as a distributed key store.) Thus, Jag drives may be programmed to allow use of multiple encryption keys per cartridge. However, the multiple key functionality may go unused because the only way the drive may know when to switch from using one key to another is if an application issued a command to switch.

Thus, because tape drives are essentially limited to using only one encryption key per cartridge, in one embodiment, the tape drives are allowed to generate many encryption keys at a time and store them together in one or more special datasets. These special datasets are known as Key Store DataSet (KSDS). The EKDS's may be stored only in the Housekeeping region (from LP2 to LP3), though they potentially may be stored elsewhere (e.g. in a separate partition). Since some tape drives use 256 bit keys to do encryption, to store a truly random key, a full 256 bits (=32 bytes) is required. The illustrated embodiments may additionally store some form of checksum with each key. If an 8-byte check sum is used, then 40 bytes are needed total to store each key. The dataset size used for LTO-5 allows storage of 2,472,040 bytes of data, which means 61801 keys, which require 40 bytes each to be stored (this is just more than 60×1024 so it may be assumed, as an example only, that the number of keys per KSDS as 60K). Furthermore, for illustration purposes, it may be assumed that one KSDS is created at a time but more KSDSs are created, as needed, up to some maximum number of KSDS that can be stored, depending on where they are stored.

Moreover, at least 192 KSDSs may be stored resiliently and in a special way in the LP2-LP3 region, which means more than 10 million keys may be stored. Note that LTO-6 may store 3 Terabyte (TB) natively per cartridge, so 3 million 1 megabyte (MB) files (before DSIT) or perhaps as many as 10 million 1 MB files after compression may be stored. Thus, as long as the minimum file (or file set) size is appropriate (in the MBs or larger) the LTO-6 tape cartridge with files may be filled, each encrypted with a unique key. If the files are very small in size (e.g. 4 KB) or compressible, the illustrated embodiments may run out of keys for any reasonable number of KSDSs if an attempt is made to uniquely encrypt each file and yet still fill a cartridge. The AME on LTO may require that all key changes be on a dataset boundary—which means each time a new key is used, essentially 2.4 MB of tape storage space is consumed, even if the amount of data written between key changes is significantly less. As will be discussed below, each KSDS may be written more than once for redundancy. Each KSDS may be storing encryption keys "in the clear". Note that the methodology above can be combined with standard transparent encryption, such as LME. In that case, the key served to it by the key manager is used (either directly or indirectly) to encrypt the KSDS such that all the keys stored there are encrypted and thus unreadable, even if a KSDS could be successfully copied off of a tape cartridge.

There are two ways that the multiple encryption key method can be implemented. First, by an anonymous method to allow application transparency. If the tape drive can detect where one data construct ends and the next starts, it may potentially encrypt one set of data with one key, and the next set with a different key. While this is not generally possible, some cases allow for this possibility. For example, if an application wrote files one at a time to tape in a specific way, such that all the file data is written, and then a perform a File Mark, then the tape drive may change encryption keys at each File Mark and effectively encrypt each file with a different encryption key. However, this process presents several challenges. First, the files are not written in such a way that the tape drive may automatically detects where to switch keys. Second, the drive is modified to switch keys automatically. As an example, to erase a data block, the data block are spaced out and then an erase is performed. The drive would then have to see what is happening, determine the key used to encrypt that set of data (e.g. by reading the DSIT), then go back and delete the appropriate key. However, this is not a natural drive operation since the erase violates the tape access method. Another option available is that key switches may be noted and recorded in the KSDS. For example, the data stored with each key could be extended to include either the (Total) Record Count or (Total) Filemark Count or (Total) Block Count (sum or Record and Block) of the first block of data encrypted with that encryption key, as well as the number of blocks which use that key. In this case, a modified shred may be used, where an application provides a (Total) Record/Filemark/Block Count with the key shred request, and the tape drive determines which key to shred. The extra overhead of storing the Record/Filemark/Block Count would somewhat reduce the number of encryption keys that can be stored for a given number of KSDSs. Requiring support for a new extended Key Shred means the mechanisms need to be modified.

In one embodiment, the Application (or middleware) assisted method is provided. Each application or piece of middleware may be modified to use the multiple key capabilities. A command may be issued by the application that effectively indicates to the tape drive to witch to using the next encryption key and return a label that may be used in the future to refer to that key. By way of example, it is assumed that the command is a new extension to one of the existing commands used to provide encryption keys to the tape drive. Also, it may be assumed that the key label returned is either the direct address of that key (e.g. 4.351, is essentially a dense version of "use the key at position 351 in KSDS 4"), or something from that which direct address can be used to obtain or derive that direct address in a 1-to-1 way. The application or middleware then stores the key label, wherever the application and/or middleware decides. In the case of LTFS, the LTFS may store the key label back to the tape cartridge as an Extended Attribute (XA) associated with the file to be encrypted—in which case the key label is stored in the Index File written to tape as well. In the case of other applications, such as TSM, the key label might be stored to the application database which tracks all things associated with a data entity (like what tape cartridges it is stored to, and where exactly on those tape cartridges).

Subsequently, in order to later perform a write append to that data entity (which may be a file), the application or middleware issues a command, which causes the drive to use the appropriate key by providing the data entity with the key label. This command essentially indicates to use the key associated with the key label. In the case of LTFS, if a File Using Application (FUA) requests that LTFS open a file with write permissions, then LTFS retrieves the metadata associated with that file from the tape cartridge, reads the XA which contains the Key Label, and then issues a command which provides that Key Label to the drive so it can fetch the appropriate key to encrypt the data to be appended to that file. At some later time, to do a decrypting read of that data entity (which may be a file), the application issues a command, which causes the drive to use the appropriate key by providing the data entity the key label. This command essentially indicates to use the key associated with the key label. In the case of LTFS, if a File Using Application (FUA) requests that LTFS to read a file, then LTFS retrieves the metadata associated with that file from the tape cartridge, reads the XA which contains the Key Label, and then issues a command which provides the Key Label to the drive.

At some later time, to do a Secure (Cryptographic) Erase of that data entity (which might be a file), the application issues a command, which is an extension of the Key Shred command supported by Jag. This command requests that the key associated with the key label be shredded. In the case of LTFS, if a File Using Application (FUA) requests that LTFS delete a file, then LTFS retrieves the metadata associated with that file from the Index File on the tape cartridge, reads the XA, which contains the Key Label, and then issues a Key Shred of that Key Label command to the drive. Once that Key Shred operation is completed, and the original KSDS is overwritten, the encryption key associated with that file is irretrievably erased, and so the data encrypted with it is unrecoverable. In other words, the selected encrypted data has been cryptographically erased.

As pertaining to the LTFS, by applying the implementations previously described in the LTFS, the functionality in the LTFS middleware may allow for some policy mechanism to select whether a given LTFS instance is to encrypt on a per file basis. A flag may be used in the LTFS configuration file with the default state of that flag (which may be simply the absence of that flag) indicating that no encryption is to occur. If the flag is present and in the proper state, an encryption on a per file basis may be performed. It should be noted that the encryption may require a finer granularity, such that a given LTFS instance will encrypt some cartriges on a per file basis and not others (e.g. perhaps some subset have to remain in unencrypted). There are multiple ways this may be accomplished. One such way is to have the encryption flag essentially be a property of the cartridge, such as an XA associated with the file folder, which is the cartridge. In such a case, a cartridge is LTFS formatted and then the XA to encrypt on a per file basis is set (this may be performed as an extension to the format command, or alternatively by another utility or program after it was formatted).

When a cartridge is to be encrypted on a per file basis, then each time LTFS opens a new file to write to it, the tape drive is instructed to switch to use of the next key and return a label, which the drive may use in the future to refer to that key. Note that if this is the first such request, the drive may have to generate keys to create the first KSDS. Similarly, if the drive has used up all the keys it presently has available, the mechanisms may generate new keys. LTFS then takes the returned key label and writes it out as a XA of that file by updating the Index File.

When a cartridge has a file, which was encrypted on a per file basis, each time LTFS opens that file to write to it, the LTFS instructs the drive to switch to use of the key with this key label. In this way, the same key is used to encrypt all the data associated with a file, even if that file was modified multiple times and has a present valid extent list which includes extents which are spread out over multiple different areas of the tape. It should be noted that when the original file was written it was essentially written with the next available key and the key label was stored. However, when the file is updated, the key label is read from the XA where it was stored and sent to the drive. In this case, LTFS is requesting that updates to the file be encrypted with a certain key (e.g., the key specified by the key label that was sent.)

Similarly, when LTFS needs to read a cartridge that has a file that was encrypted on a per file basis, the LTFS reads the key label used to encrypt that key from the XA and serves that to the drive and essentially commands to decrypt with the key. In an alternate embodiment, it may be preferable, where the only thing to be done is a decrypting, to read where the LTFS tells the drive to determine which encryption key to use during a read. The drive can do this by reading the key label from the DSIT and then using that key label as an index into the KSDS to fetch the key and then decrypting with that key. When LTFS needs to cryptographically erase a file from the cartridge that was encrypted on a per file basis, the LTFS reads the key label used to encrypt that key from the XA. The LTFS then provides that to the drive in an extended Shred command—the extension has this command essentially telling the drive to "shred the key with this label". It should be noted that because all the extents associated with a given file are written with the same key, all extents that ever comprised that file (even those that have since been invalidated and so are not listed in the present valid extent list) are cryptographically erased when that key is shredded.

Furthermore, it is necessary to securely erase a KSDS. In one embodiment, the KSDS will only be written in the LP2 to LP3 region where no user data is written and so logical overwrite is not an issue. It should be noted that KSDS data written in the LP2 to LP3 region is not written continuously so that upstream KSDS data may be written on the same wrap as downstream KSDS data without making that KSDS data unreadable. The KSDS may not be written on every wrap; instead the KSDS may be laterally dispersed so that shingling is not an issue. The KSDS may always be written on a wrap which has two empty wraps straddling it so that all three wraps can be erased, which assures that no longitudinal slice of the KSDS is left unerased. The KSDS may be written in a special way that allows a certain amount of toleration of servo errors. The KSDS may be written such that more than one copy has to be read to recover the keys, so that if one KSDS cannot be overwritten one can still be certain the keys are not recoverable.

Furthermore, the Key Set DataSets (KSDS's) may only be written to the LP2 to LP3 region. It should be noted that there might be at least 12 locations in the LP2-LP3 region that may be used. There may be 20 wraps per Data Band in LTO-5, 10 forward and 10 reverse. In the case of Data Band 0 these are wraps 1, 3, . . . 19 (forward) and wraps 2, 4, . . . 20 (reverse). To address the problem with tolerances, KSDS may not be written on every wrap. Instead the KSDS may be written so that the adjacent track on either side may be erased. For example, a KSDS might be written in wrap 5. When it comes time to overwrite that KSDS on wrap 5, one may erase the necessary length of tape on wraps 3, 5, and 7, which will definitively erase track 5—independent of any reasonable Lateral Tape Stability (LTS) or mechanical tolerancing issues. (It is assumed, by way of example only, to use of (relative) wraps 5, 11, and 17 on each data band in the LP2-LP3 region of an LTO-5 tape (allowing wrap 1 to be used independently (e.g. for HKDS). Since there are 3 wraps in each of 4 data bands, this means 12 wraps are written. A given KSDS may be written four times to a wrap pair. The reverse wraps corresponding to (5, 11, and 17) to create the pair are (6, 12, and 18).

To address the potential problem with servo errors preventing erasure, consider the following. Since the proposal is to write four shares of each KSDS, the KSDS may be divided so that two shares are written forward on one wrap and two other shares are written on another wrap in reverse. (Forward writing of the first share could begin on a wrap at LP2, forward writing of the second share could begin at (LP2+LP3)/2 on that same wrap, reverse writing of the third share could begin at LP3 on another wrap, and reverse writing of the fourth share could begin at (LP2+LP3)/2 on his same other wrap.) Each share of a KSDS may be different in a special way. A special technique known as a Shamir Secret Sharing algorithm ("Shamir"), which allows a key to be split into shares, may be implemented. In the case of the Shamir algorithm, each key share is the same length, which is the length of the original key being split (in the case here, the original key and all key shares would be 32 bytes long). Shamir shares may be created such that any key can be divided into N shares in a special way such that M (<N) of those shares are required to re-create that key. By way of example only, the mechanisms employ use of M=2 and N=4. Thus, each KSDS may be split into 4 shares, each of which is different in a special way, and each of which is written to tape. In this case one, the mechanisms may able to read two of them to recover the keys in the original unsplit KSDS.

By way of example only, consider the scenario where the mechanisms proceed systematically to erase the previous written KSDS and replace it with a new KSDS. The mechanisms may first assume no servo errors. Thus, the first share of the old KSDS is erased, in 3 passes (e.g. to definitively erase wrap 5 one must erase wraps 3, 5, and 7), and then an overwrite is performed (e.g. on wrap 3) with the first share of the new KSDS. At this point the old KSDS is still recoverable (since 3 of the 4 shares still exist), but the new KSDS is not (since only 1 of the eventual 4 shares are written). Next the second share of the old KSDS is erased, in 3 passes, and then an overwrite operation is performed with the second share of the new KSDS. At this point the old KSDS is still recoverable (since 2 of the 4 shares still exist) as is the new KSDS (since 2 of the eventual 4 shares are now written). Next the third share of the old KSDS is erased in 3 passes, and then an overwrite operation is performed with the third share of the new KSDS. At this point, the old KSDS is no longer recoverable (since only 1 of the 4 shares still exist), but the new KSDS is (since only 3 of the eventual 4 shares are written). Finally, the fourth share of the old KSDS is erased, in 3 passes, and then an overwrite operation is performed with the fourth share of the new KSDS. At this point the old KSDS no longer exists at all (since 0 of the 4 shares still exist), but the new KSDS is (since all 4 shares are written). It should be noted that at no point are the keys to be retained unrecoverable, even were a write permanent error occur.

By way of example only, consider the scenario where a servo error occurs, which prevents either definitive erasure of one of the adjacent tracks or continuous overwrite of some KSDS share. First, the tape drive should monitor whether a servo errors occurs. As previously discussed above, a set of KSDS's is erased and overwritten (in 3 passes on 3 adjacent wraps). Before starting the 3 passes, the mechanisms should first carefully detect the exact longitudinal extent of the set of KSDSs—specifically the LPOS at which writing of that set began and the LPOS at which it ended. This action determines the longitudinal extent that must be definitively erased and overwritten with the new set of KSDSs. If the Write Gates stays active on all 3 passes for the full longitudinal extent of the old set of KSDS, the old set of KSDS is now considered securely erased. However, if the Write Gate is consistently (i.e. even on retry) degated by a servo error such that one of the 3 erase/write passes is not continuous then the share of the old set of KSDSs has to be considered recoverable. Yet there should be at least one retry on any erase or write pass of a KSDS to determine if on retry it can not be erased (or written) continuously (i.e. without being interrupted by a servo error). If the subsequent erase or write retry succeeds continuously, secure (cryptographic) erasure of select encrypted data written to tape for the one write/erase pass should be considered to have been completed successfully.

Moreover, consider the scenario where a servo error occurs, which prevents either definitive erasure of one of the adjacent tracks or continuous overwrite of some KSDS share. By way of example only, assume that servo error occurs on the first share of the KSDS. In such case, the mechanisms of the present invention attempt to perform an erase, in 3 passes, of the first share of the old KSDS. There is a servo error, which prevents continuous erasure. Assume, for example, that the new first share of the KSDS may be written down stream of the servo error. At this point the old KSDS is still recoverable (all of 3 of the 4 still exist, and at least a part of the 4$^{th}$ share), but the new KSDS is not (since only 1 of the eventual 4 are written). Assume, for example, the next 3 copies are erased and overwritten uneventfully. At this point the old KSDS is not recoverable (since only part of one of the 4 copies exist), and the new KSDS is not (since all 4 copies are written).

It should be noted that at no point are the keys to be retained unrecoverable, even were a write permanent error occur. It should also be noted that the mechanisms described above works so long as only one of the four shares cannot be overwritten, regardless of which of the 4 original copies of the KSDS it was that could not be overwritten—so long as the new copies can be. In the case where servo errors are so severe, the mechanisms cannot write any new share successfully (even when it is longitudinally dispersed via write skipping). Thus, the mechanisms cannot the write resulting in a permanent write error. In the very unlikely case that two of the shares of the old KSDS (the one to be cryptographically erased) cannot be overwritten (or over-erased) because consistent serve errors forces the old KSDS to be laterally dispersed (write skipped), then the mechanisms consider that the old KSDS are recoverable (since 2 of 4 copies are potentially recoverable). When the $2^{nd}$ of these two shares cannot be successfully overerased (over-written), the drive should treat this like a permanent write error of the new KSDS. In the case of a write permanent error, when trying to write one of the first two KSDS, then one has not written it successfully and has invalidated the previous KSDS. In this case, all file data to be retained should be migrated off the bad cartridge onto a new tape cartridge. That involves a decrypting read from the first cartridge and an encrypting write to the second cartridge. The first cartridge should then be definitively and irreversibly destroyed (e.g. incinerated) such that even forensic data recovery is not possible. It should be noted that the redundancy and resiliency discussed above should make the case of migration and destruction a very rare (e.g. 1 in 100,000) exception case.

In one embodiment, it is necessary to prevent the KSDS from being read. All of the significance of the steps discussed above, to definitively erase the keys, is reduced if the KSDS may be read and stored external to the cartridge. To prevent this, the tape drive code operation may be changed to prevent transfer of KSDS datasets under any normal condition. It should be noted that since the KSDS are outside the user region, the KSDS are not readable with any standard small computer system interface (SCSI) command, but KSDS should not be accessible via any engineering or debug command supported by drive code shipped to the field. This is a drive microcode control, the intent of which is to prevent a reading of the cartridge remotely (e.g. say they hacked into the SAN). If a user had physical possession of the cartridge, the cartridge may have it read by an instrumentation test stand or via a modified drive. It should be noted that if LME transparent encryption is used on top of the previously discussed steps for the per file encryption, then the KSDS itself encrypted—which means the keys in the KSDS are not accessible unless one has the key which encrypted the KSDS.

Since the tape drive cannot know a priori that it will not receive a future key change request, the tape drive cannot know if a cartridge will be uniformly encrypted with a single key, which if a tape drive presumes use of such a key additional problems and complexities arise.

In one embodiment, the mechanisms described below in method 2, in either the single key or multi-key case, are more flexible and less problematic. Thus, consider the following methods.

Exact Controls from a LTO Logical Format POV—Method 1

First, an indication must be given to a tape drive that a user dataset was protected by a shred key in the KSDS. The Landsat Technical Working Group (LTWG) should determine the best way for this indication, and in one embodiment, the mechanisms may create a new state for the existing encrypted Flag to satisfy this indication. Specifically, when the encryption flag is set to '2' the encryption flag means that the key used to protect this data set is stored in a KSDS and the Copy of AAD Field actually contains a pointer to which shred key in which KSDS was used. With this assumption, using "W(a, b)" to mean a key 'a' wrapped with another key 'b' and that the tape drive is served a key from an outside key manager called the Served key (Sk). The following will describe the a secure option, where the mechanisms of the present invention are using both transparent encryption (e.g. LME) to protect the cartridge and File Level Encryption to allow Secure (cryptographic) erasure of select encrypted data written to tape shredding on a per file basis. It should be noted that the illustrated embodiments may still have the base File Level Encryption to enable shredding without use of transparent encryption or externally served keys. Thus, the following configuration may be applied:

User Data Set (LTO-5 Case, Meaning with Indirection):
All data in the Data Set is encrypted with a drive Generated key (Gk)
In Dataset Information Table (DSIT):
   Encrypted Flag=2
   Wrapped Key field=W(Gk, Fk)
   Copy of AAD Field=pointer to location of Fk (i.e. which key in which KSDS)
KSDS:
All keys in the KSDS are encrypted with a drive generated key store key (KSk)
In Dataset Information Table (DSIT):
   Encrypted Flag=3 (to represent this KSDS encryption technique)
   Wrapped Key Field=share of W(KSk, Sk)
   Copy of AAD field=the key label the external key manager needs to fetch Sk It should be noted that in the Wrapped Key Field the mechanisms are only storing a share of W(KSk, Sk). The mechanisms may not create W(KSk, Sk) unless the mechanisms have a proper threshold (> or =M) per the Shamir key split. In such a case the follow configuration may be applied:
User Data Set (LTO-5 Case):
All data in the Data Set is encrypted with a drive Generated key (Gk)
In Dataset Information Table (DSIT):
   Encrypted Flag=2
   Wrapped Key field=W(Gk, Fk)
   Copy of AAD Field=pointer to location of Fk (i.e. which key in which KSDS)
KSDS:
All keys in the KSDS are encrypted with a drive generated key store key (KSk)
In Dataset Information Table (DSIT):
   Encrypted Flag=4 (to represent this KSDS encryption technique)
   Wrapped Key Field=share of W(KSk)
   Copy of AAD field=<empty>

Moreover, to further describe method 1, consider that a LTO-5 KSDS would nominally be 115 mm long (it will be shorter in LTO-6 because the linear density is increased), so to store 16 nominally requires 1.84 meters of tape.) The nominal distance between LP2 and LP3 is 8 meters, so there is nominally room to write a set of 16 KSDSs more than four times between LP2 and LP3 on a given wrap in a given direction. It may be assume that each KSDS may be written four times, twice in the forward direction on one wrap (from LP2 to LP3), and twice in the reverse direction on another wrap (from LP3 to LP2). For each 16 KSDSs which can be stored, 16×60K~=1M keys can be stored. There may be ample room to write a set of 16 KSDSs multiple times between LP2 and LP3 on a given wrap in a given direction, which is described in more detail below. If a pair of wraps, one forward and one reverse, in this LP2-LP3 region, is dedicated to storing a given set of 16 KSDSs, then it may be stored 4 times in a way which gives more than adequate redundancy. There may be at least 12 such wrap pairs available on an LTO-5 cartridge, so roughly 10 million keys could be accommodated. Also, other options for storing even more keys are discussed below. It should be noted that writing 16 KSDS at a time means 16×2.4 MB=38.4 MB are written and if that is the content, about 48 MB of memory space may be consumed. If the original is taken and perform a Shamir key split into 4 shares, and store those in memory in addition to the initial unsplit 48 MB, 5×48 MB=240 MB of memory total may be required. If more than 10 million keys are truly needed, then the method may be extended and modified (e.g. create a separate partition to store KSDSs in which case many, many more can be stored, potentially opening the door to encrypting many more than 10 million files each with a different encryption key).

It should be noted that there are several different strategies to pursue with respect to writing the KSDS. One option is pre-generating all the keys, thereby only requiring KSDS overwrite for erase. In this case, it is sufficient to not use all of the keys, because it is sufficient to leave remnants when new data is added—only an assured delete is required when keys are removed/shredded. There is a performance advantage for not requiring a KSDS update on new index boundaries (otherwise this would result in long locate/write/locates during what could otherwise be streaming writing). A new option, for example, may be referred to as "Command 1" in the set data encryption page of the SPOUT command. A SPIN command requesting the Data Encryption Status page would then follow to retrieve the key label in the KAD data. To do a write append, a subset of Command 1 may be performed. In other words, the new option in the Set Data Encryption page of the SPOUT command is performed.

The second new option may be referred to as a "Command 2" where the Jag key shred command is vendor-specific. For a standardized command, something new needs to be added to the standard and this may be a new command that passes the key label and indicates to shred the key related to the label.

In one embodiment, a new encryption method is performed that is referred to as "Method 2." The first encryption method, previously described, provides the necessary shreddability functionality even when tape encryption is used in the prevalent ways certain tape encryption is used today—which is specifically tape encryption with a single encryption key. A transparent tape encryption method (whether LME or SME (for z/OS or Open)) may essentially encrypt the entire cartridge using a single served key. Transparent tape encryption may be more prevalently deployed tape encryption model but the mechanisms may also support AME. The AME may be managed one of two ways. The AME may choose to encrypt all the data with a single key (what TSM does). However, the T10 command set also allows AME keys to be changed on a per block basis. Also, method 1 does not allow for encryption keys to be changed frequently, since a given Data Key becomes entangled with a large number of shred keys in a KSDS because it is used to encrypt it. Thus, this second encryption method (method 2) enables a large number of tape encryption keys, allows for frequent key changes, and/or allows for frequent changes between writing of encrypted data and unencrypted data, as allowed by the T10 tape encryption model. This is achieved by writing KSDSs without any dependence on a served key. Instead, a drive-generated key only protects the KSDS's for protecting the key store—and this is only for the purposes of enabling a Shamir key split. Security is not a problem because the shred keys will not be used directly to encrypt a tape cartridge. Similarly, served keys cannot be used directly to encrypt user data, because there would be no dependence on the shred keys, and thus, the ability to shred data is lost. Instead an encryption key will protect user data, which is dependent on both the served keys and the shred keys. The two keys are combined via a key derivation function (KDF). It should be noted that there may be different types of KDFs. One KDF may be to either calculate a simple hash (e.g. SHA-256) across a concatenated data field, which includes both the served key and the shred key. Alternately, another KDF may use a hash-based message authentication code (HMAC) (which is based on a hash function). Another KDF may encrypt one with the other (e.g. encrypt the shred key with the served key) and use the encrypted result as the key to protect user data. An acceptable KDF may be selected that may process a served key and a shred key into a resultant derived key. The resultant derived key protects the user data in the same way a served key is used today. For example, in the LTO-4 case the resultant derived key could be used to encrypt user data directly. Also, in the LTO-5, the resultant derived key may be used indirectly to wrap a drive generated encryption key. With the LTO-5, the drive generated encryption key may be the one actually used to encrypt user data.

Exact Controls from a LTO Logical Format POV—Method 2

In each dataset, a need exists for pointing a tape drive to the two items it must input to a KDF to find the key used to protect the user data. As will be described below, in one embodiment, the illustrated embodiments may be applied to LTO-5 (which may be adopted by the LTO-6). The Landsat Technical Working Group (LTWG) should determine the best way for this indication, and in one embodiment, a new state is created for the existing encrypted flag to satisfy this indication. Specifically, when the encryption flag is set to '2' the encryption flag means that the key used to protect this data set is stored in a KSDS and the Copy of AAD Field actually contains a pointer to the shred key in which KSDS was used. Using the nomenclature "W(a, b)" to mean a key 'a' wrapped with another key 'b' And assuming that the drive is served a key from an outside key manager called the Served key (SeK) and that there exists an associated Shred key (ShK) in a KSDS, the following configuration may be used:

KDF:
SeK and ShK are combined to produce a Derived key (Dk)
User Data Set (LTO-5 Case, Meaning with Indirection):
All data in the Data Set is encrypted with a drive Generated key (Gk)
In Dataset Information Table (DSIT):
  Encrypted Flag=2
  Wrapped Key field=W(Gk, Dk)
  Secure (cryptographic) erasure of select encrypted data written to tape
  [new] Shred Key Pointer=location of ShK (i.e. which key in which KSDS)
  Copy of AAD Field=the key label the external key manager needs to fetch SeK
KSDS:
All shred keys in all KSDSs are encrypted with a drive generated key store key (KSk)
In Dataset Information Table (DSIT):
  Encrypted Flag=3
  Wrapped Key Field=Shamir share of KSk
  Copy of AAD field=<empty>
It should be noted that in the Wrapped Key Field only a share of the KSk is stored. The mechanisms may not recreate KSk unless the mechanisms have a proper threshold (> or =M) per the Shamir key split.

In one embodiment, a new encryption method that is referred to as "Method 3" is indicated. The third method considered, is similar to method 2, except the KSDS are allowed to be protected by an externally served Cartridge key (Ck). In this way, the Shred keys may not be read in the clear even if a user gets a hold of the cartridge. It should be noted that method 3 is introducing a cartridge global served key, which is another obstacle to transparency. Attempting method 3 from the start (e.g. when shred keys are generated) is problematic and only makes sense if a drive may definitively know that all encryption will be done with a single served key.

Although the drive does not know all encryption will be done with a single served key, the illustrated embodiments may indicate the encryption will be done with a single served key after the fact. For example, if a cartridge is encrypted with LME, then the cartridge is encrypted with a single key. If that cartridge is written by an application, such as TSM or NBU, then the cartridge is typically streamed full. The drive may detect that the cartridge was streamed full and all encrypted with a single key. In this case, the mechanisms may go back and then protect the shred keys in the KSDS's with that same encryption key thereby preventing these shred keys from being read, even with an instrumentation drive. Whether the mechanisms put in place a change so that the drive knows that the drive will be encrypted with a single key a priori or whether the drive figures that out for itself by the way the cartridge was written/encrypted, either way the mechanisms may protect the KSDS by setting the just discussed Ck to SeK. It should be noted that if the mechanisms go the route of having the drive figure out the drive will be encrypted with a single key a priori, in one embodiment, the KSDS's would be encrypted from the start protected by Ck, and the Ck then would be stored as a separate entity (in an EEDK type structure, though at this point the Ck is not wrapped with anything). Then, if the drive determines the cartridge was protected by a single encryption key, the drive may go and wrap Ck with the SeK to create a new EEDK, which the drive then writes (securely) over the previous EEDK (as if it were rekeying the EEDK, though in this case "wrapping the encryption key which encrypted the shred keys" would be more accurate). The following configuration may be used:

KSDS:
All shred keys in all KSDSs are encrypted with a drive generated key store key (KSk)
In Dataset Information Table (DSIT):
    Encrypted Flag=1
    Wrapped Key Field=Shamir share of W(KSk, Ck)
    Copy of AAD field=the key label the external key manager needs to fetch Ck In one embodiment, methods 2 and 3 enable the shred and encryption to be completely independent. Methods 2 and 3 both allow for complete independence of shred keys and encryption keys. Thus one application (e.g. LTFS) may be changing shred keys on whatever boundary made sense to the application (e.g. at file boundaries) and a completely independent entity (e.g. HP's SKM) may be working inter-operatively with the drive to change encryption keys on some other boundary that made sense to the application (e.g. write append boundaries). Thus, a given shred key may span through use of multiple encryption keys. The converse is also true in that a given encryption key may span through use of multiple shred keys so the two types of keys may transition completely independently of one another.

To further illustrate the mechanisms of the present invention, a File Using Application may write data to tape via LTFS, as will be described in FIG. 3 and FIG. 4. An LTFS may be configured to encrypt each file with a separate key. The File Using Application may later delete each file encrypted with a separate key. LTFS may be configured to do a secure (cryptographic) erasure of a file when it is deleted. If so, LTFS would delete the keys used to encrypt that file data and then definitively erase and then rewrite the KSDS in a way, which is resilient against common errors (such as servo errors) and still prevent even forensic data recovery of that data. The illustrated embodiment may be applied to any data tape technology (e.g. IBM's 3592, Oracles T10000, etc.), which has the equivalent of a Housekeeping Dataset area, even if that tape technology is not LTO based and any sequentially written storage, even if it is not tape—e.g. CD or DVD.

Figure 4:
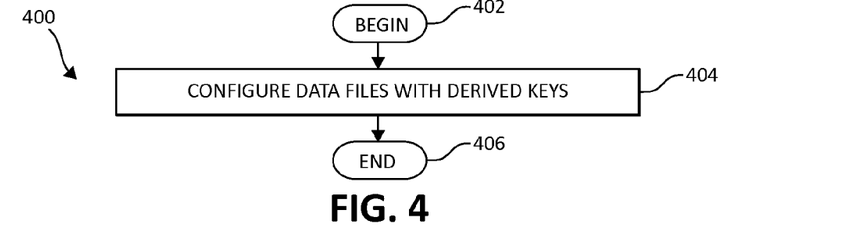
FIG. 4 is a flowchart illustrating an exemplary method for cryptographic erasure of selected encrypted data.

Turning to FIG. 4, a flowchart illustrating an exemplary method 400 for cryptographic erasure of selected encrypted data is depicted. The method 400 begins (step 402). The method 400 may configure data files with derived keys, the derived keys adapted to be individually shredded in a subsequent erasure operation and allow for cryptographic erasure of selected encrypted data in the data files without necessitating at least one of removal and rewrite of retained data (step 404). The method 400 ends (step 406).

Figure 5:
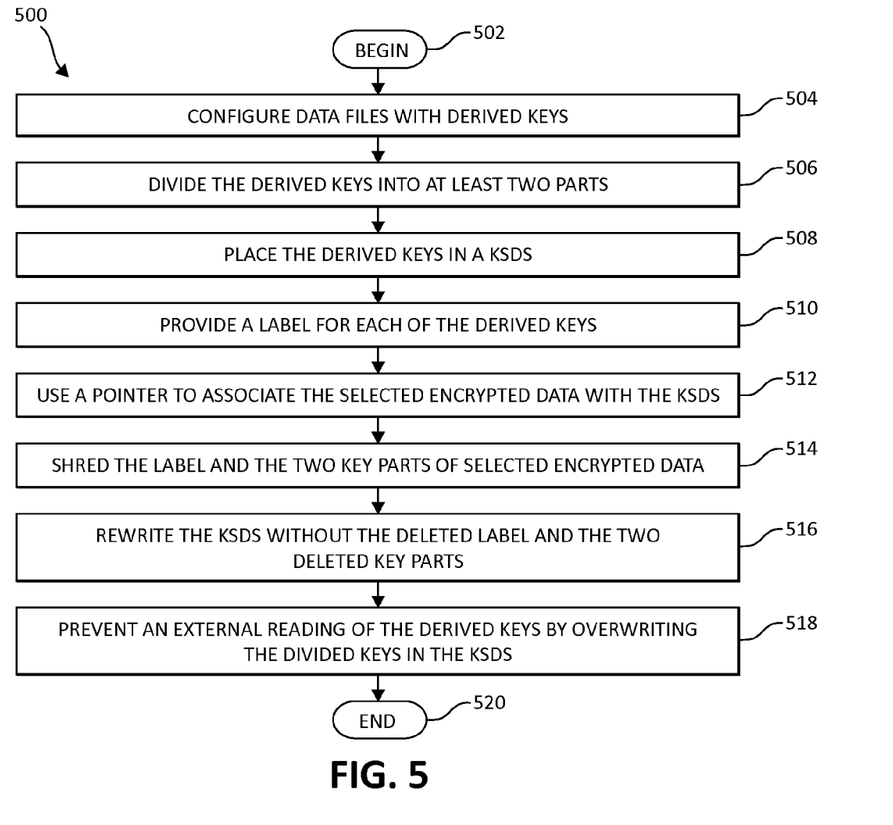
FIG. 5 is a flowchart illustrating an exemplary method for cryptographic erasure of selected encrypted data with derived keys.

Turning now to FIG. 5, a flowchart illustrating an exemplary method 500 for cryptographic erasure of selected encrypted data with derived keys is depicted. The method 500 begins (step 502). The method 500 may configure data files with derived keys, the derived keys adapted to be individually shredded in a subsequent erasure operation and allow for cryptographic erasure of selected encrypted data in the data files without necessitating at least one of removal and rewrite of retained data (step 504). The derived keys are divided into at least two parts (step 506). Redundant data of the two parts may be deleted together. The derived keys are placed in a key store data set ("KSDS", e.g., a key file) (step 508). A label for each of the derived keys is provided (step 510). A pointer may be used to associate the selected encrypted data with the KSDS (step 512). The method 500 may shred the label and the two key parts of selected encrypted data (step 514). It should be noted that failure to shred each of the at least two key parts does not prohibit the shredding. The method 500 may rewrite the KSDS without the deleted label and the two deleted key parts (step 516). An external reading of the derived keys is prevented by overwriting the divided keys in the KSDS (step 518). Thus, forensic recovery means are prohibited from accessing the erased selected encrypted data. The method 500 ends (step 520)

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for cryptographic erasure of selected encrypted data by a processor device in a computing environment, the method comprising:
   encrypting data files with a plurality of derived keys, wherein:
      each derived key comprises both a shred key for deleting the data files and a served key for encrypting the data files, and
      the plurality of derived keys are adapted to be individually shredded in a subsequent erasure operation;
   placing the plurality of derived keys in a key store data set (KSDS);
   encrypting the KSDS with a different key than any of the plurality of derived keys;
   providing a label for each of the shred key and the served key in the KSDS;
   shredding the label, the shred key, and the served key, wherein failure to shred the shred key and the served key does not prohibit the shredding; and
   rewriting the KSDS without the deleted label, the shred key, and the served key.

2. The method of claim 1, further including preventing an external reading of the plurality of derived keys by overwriting the plurality of derived keys in the KSDS.

3. The method of claim 1, further including, in conjunction with the placing the plurality of derived keys in the KSDS, using a pointer to associate the selected encrypted data with the KSDS.

4. The method of claim 1, further including performing the cryptographically erasing of the selected encrypted data in the data files via a plurality of applications, wherein the performing occurs in a plurality of data tape technology and sequentially written storage devices.

5. A system for cryptographic erasure of selected encrypted data in a computing environment, comprising:
   at least one tape drive; and
   at least one processor device connected to the at least one tape drive operable in the computing environment, wherein the at least one processor device is adapted for:
      encrypting data files with a plurality of derived keys, wherein:
         each derived key comprises both a shred key for deleting the data files and a served key for encrypting the data files, and
         the plurality of derived keys are adapted to be individually shredded in a subsequent erasure operation,
      placing the plurality of derived keys in a key store data set (KSDS),
      encrypting the KSDS with a different key than any of the plurality of derived keys,
      providing a label for each of the shred key and the served key in the KSDS,
      shredding the label, the shred key, and the served key, wherein failure to shred the shred key and the served key does not prohibit the shredding, and rewriting the KSDS without the deleted label, the shred key, and the served key.

6. The system of claim 5, wherein the processor device is further adapted for preventing an external reading of the plurality of derived keys by overwriting the plurality of derived keys in the KSDS.

7. The system of claim 5, wherein the processor device is further adapted for, in conjunction with the placing the plurality of derived keys in a key store data set (KSDS), using a pointer to associate the selected encrypted data with the KSDS.

8. The system of claim 5, wherein the processor device is further adapted for performing the cryptographically erasing of the selected encrypted data in the data files via a plurality of applications, wherein the performing occurs in a plurality of data tape technology and sequentially written storage devices.

9. A computer program product for cryptographic erasure of selected encrypted data in a computing environment by a processor device, the computer program product comprising a non-transitory computer-readable storage medium having computer-readable program code portions stored therein, the computer-readable program code portions comprising:

computer code for encrypting data files with a plurality of derived keys, wherein:

each derived key comprises both a shred key for deleting the data files and a served key for encrypting the data files, and         the plurality of derived keys are adapted to be individually shredded in a subsequent erasure operation;

computer code for placing the plurality of derived keys in a key store data set (KSDS);

computer code for encrypting the KSDS with a different key than any of the plurality of derived keys;

computer code providing a label for each of the shred key and the served key in the KSDS;

computer code shredding the label the shred key and the served key, wherein failure to shred the shred key and the served key does not prohibit the shredding; and     computer code rewriting the KSDS without the deleted label, the shred key and the served key.

10. The computer program product of claim 9, further including computer code for preventing an external reading of the plurality of derived keys by overwriting the plurality of derived keys in the KSDS.

11. The computer program product of claim 9, further including computer code for, in conjunction with the placing the plurality of derived keys in the KSDS, using a pointer to associate the selected encrypted data with the KSDS.

12. The computer program product of claim 9, further including computer code for performing the cryptographically erasing of the selected encrypted data in the data files via a plurality of applications, wherein the performing occurs in a plurality of data tape technology and sequentially written storage devices.

* * * * *